Aug. 17, 1965  L. C. NEUFELD  3,200,667
CONTROL DEVICE FOR WINDSHIELD CLEARING SYSTEMS
Filed April 12, 1962

INVENTOR.
LEONARD C. NEUFELD
BY
ATTORNEY

United States Patent Office 3,200,667
Patented Aug. 17, 1965

3,200,667
CONTROL DEVICE FOR WINDSHIELD
CLEARING SYSTEMS
Leonard C. Neufeld, Des Moines, Iowa, assignor to The
Delman Company, Cookeville, Tenn., a corporation of
Tennessee
Filed Apr. 12, 1962, Ser. No. 186,984
1 Claim. (Cl. 74—479)

This invention relates generally to vehicle windshield clearing systems and in particular to the actuating linkage for a control device providing for the concurrent operation of the wiper and washer units in such systems, or for the operation of the wiper unit alone.

The primary object of this invention is to provide an improved and simplified linkage between plural operators of a windshield wiper motor and the control member for the motor.

A further object of this invention is to provide an improved interconnecting linkage between plural operators for a windshield washer motor having different lengths of travel wherein the linkage is effective to move a control member for the motor in the proper manner regardless of which operator is actuated.

A further object of this invention is to provide a control unit for a motor operable by dual mechanisms having different effective lengths of travel, wherein the control unit is similarly operated in the control of the motor, regardless of which mechanism is operated.

A more specific object of this invention is to provide a control attachment for a fluid windshield wiper motor including a pivoted link member so connected with the control member that actuation of either of two motor operating mechanisms having different lengths of travel will move the control member the proper amount to effect operation of the fluid motor.

With the foregoing and other objects in view, the invention resides in the following specification and appended claim, certain embodiments and details of construction of which are illustrated in the accompanying drawings in which:

Figure 1:
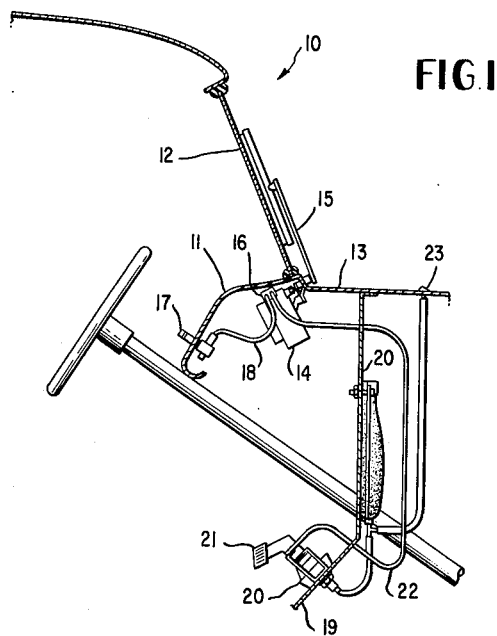
FIGURE 1 is a partially sectioned, fragmentary view in side elevation of a windshield wiper and washer system for a vehicle to which the invention may be applied.
Figure 4:
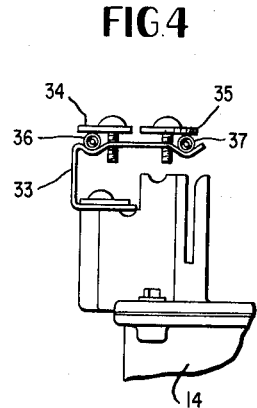
FIGURE 4 is a side view taken along the lines 4—4 of FIGURE 3.

Referring more particularly to FIGURE 1, a typical windshield wiper and washer system is illustrated as being applied to a vehicle generally indicated in fragmentary form at 10. The vehicle is provided with the usual dashboard 11 and windshield 12. Connected to the underside of a frame portion 13 by any suitable means is a conventional windshield wiper motor 14, which may be either pneumatic or electrical in form. The motor 14 is connected through the frame member 13 into a driving relationship with a wiper 15. Mounted on the upper side of the motor 14 is a control unit 16. Mounted on the front of the dashboard 11 is a control knob 17 which is connected on the rear side of the dashboard 11 by any suitable means with a Bowden wire 18. The terminal end of the Bowden wire is connected with the control unit 16 in a manner to be described.

Mounted on the inclined portion 19 of the firewall 20 of the vehicle is a conventional windshield washer pump assembly 20. Interconnecting the foot lever mechanism 21 of the pump 20 with the control unit 16 is a Bowden wire 22.

Briefly, the system, as thus far described, is set up to operate in a manner similar to that described in the inventor's United States Patent 2,869,164. Actuation of the control knob 17 is effective to exert a push on the Bowden wire 18 to move the control unit 16 to effect an operation of the windshield drive motor 14. Independent operation of the foot pedal 21 to apply a fluid spray from the nozzle 23 to the windshield 12 will simultaneously, through the Bowden wire 22, exert a push on the control unit 16 to thereby effect actuation of the drive motor 14.

Figure 2:
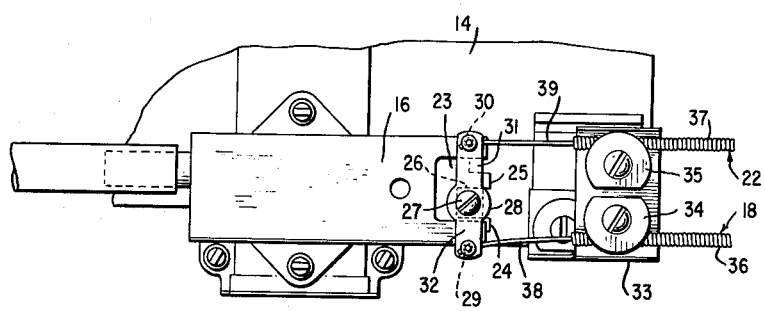
FIGURE 2 is a top plan view of the wiper motor control and actuating linkage in the system of FIGURE 1.
Figure 3:
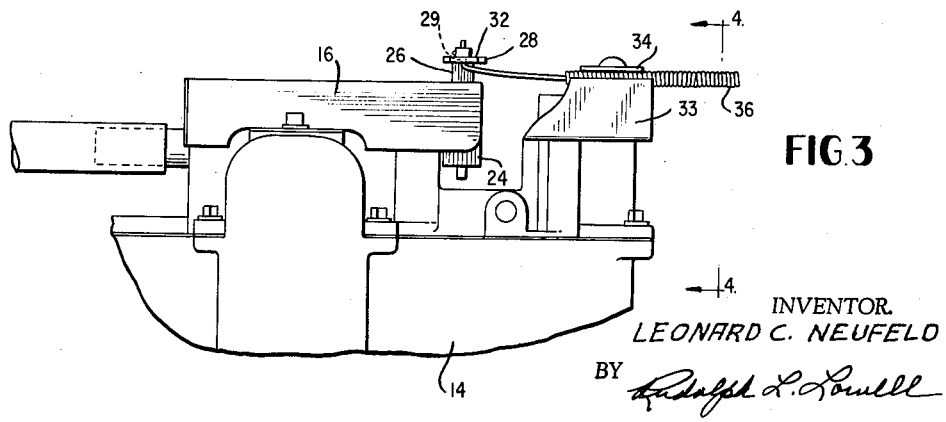
FIGURE 3 is a view in front elevation of the mechanism illustrated in FIGURE 2.

The present invention is directed primarily to an improvement in the connection between the Bowden wires 18 and 22 with the control unit 16 for the motor 14. These improvements are clearly shown in FIGURES 2 and 3. As illustrated, the control unit 16 is a valve having a reciprocal valving member 23 provided with a pair of extending clamping ears 24 and 25. Positioned within and firmly held by the clamping ears, as by a tight friction fit, is a pivot post 26 which is tapped to receive a threaded pivot pin 27. Mounted about the pivot pin 27 on top of the pivot post 26 is a member 28 provided with apertures 29 and 30 adjacent either terminal end thereof. The pivot mounting of the member 28 is such as to derive a long arm 31 and a relatively shorter arm 32 for a purpose to be described.

Affixed to the motor assembly, by any suitable means, such as bolts, is an upstanding bracket 33 which is provided with a pair of clamps 34 and 35 under which the sheathed sections 36 and 37 of Bowden wires 18 and 22 may be secured. It will be noted that the terminal ends of sheaths 36 and 37 project somewhat beyond the clamps 34 and 35 to lend a little bit of lateral flexibility to the ends 38 and 39 of the Bowden wire assemblies 18 and 22. The ends 38 and 39 of the Bowden wires are inserted into the holes 29 and 30 of the member 28 to effect a transmission connection between the Bowden wires and the reciprocating valving member 23 of the control unit 16.

In a system of this type, it has been found that movement of the Bowden wire assembly 18 to effect proper operation of the reciprocating member 23 only amounts to a travel of approximately a quarter of an inch. On the other hand, movement of the foot pedal 21 in the washer pump assembly 20 effects movement of the Bowden wire in assembly 22 approximately three quarters of an inch. It is quite obvious that compensating means must be provided in the linkage between the Bowden wires and the control member 23 in order to effectuate proper reciprocation of the member 23 to gain operation of the wiper motor 14. In the event the unit 16 is a switch for an electrical motor operation, then it would be necessary that the control member 23 include switch contact members which would travel a proper distance to bridge suitable contacts to energize the motor. In the case of fluid operation the member 23 would include suitable valving which would have to be aligned with ports to the motor 14, the latter being a fluid motor. As before stated, in either event, it is necessary that the member 23 travel a specific distance.

In the present invention, by having the arm 31 considerably longer from the pivot point to the terminal end, and by having the aperture 30 located adjacent to the terminal end, the effective reciprocation of the member 23 by the Bowden wire 22 is the same as the reciprocation effected by the movement of the Bowden wire 18, the end of which is connected to the shorter arm 32 of the member 28.

In operation, the member 28 will transmit movement from either independently actuated Bowden wires to the slide member 23. Considering the moment operation of the hand control knob 17, a turning movement thereof will result in a push on the Bowden wire 18 which will pivot the arm 28 about its connection with the Bowden wire 22 to move the member 23 a specific distance. In a like manner, actuation of the foot pedal 21 will cause the Bowden wire 22 to effect a turning movement of the member 28 about its connection with the Bowden wire 18. In each of these two events, it will be realized that the Bowden wire, not being actuated by one of the manual means, acts as a stationary pivot point or fulcrum whereby to achieve movement of the slide member 23 upon actuation of the other Bowden wire system.

Obviously the length of the member 28 and the position of each aperture 29 and 30 to either side of the pivot 27 is predesigned to assure the proper travel of the member 23 to effect motor operation.

Although the invention has been described with respect to a preferred embodiment thereof, it is to be understood that it is not to be so limited, since changes can be made therein which are intended to be within the full scope of this invention as defined by the appended claim.

I claim:

Actuating linkage for a reciprocating control unit of a windshield wiper motor comprising:

(a) a single member having opposite end sections, (b) means operatively connected to a portion of said member between said end sections pivotally mounting said member to said control unit for pivotal movement in a plane substantially normal to the plane of movement of said control unit, (c) first actuating means having a first pivot means connected with one end section of said member, and (d) second actuating means having a second pivot means connected with the other end section of said member, (e) said first and second actuating means being independently operable to selectively pivot the member utilizing the pivot means of the non-operated actuating means as a stationary fulcrum whereby the control unit is reciprocated upon operation of either of said actuating means, (f) said pivotal mounting between the member and the control unit being positioned on the member to provide the member with arms of unequal lengths between such mounting and the first and second pivot means to compensate for the differences in traverse of the first and second actuating means.

References Cited by the Examiner

UNITED STATES PATENTS 2,869,164  1/59  Neufeld _____ 15—250.02
2,957,193  10/60  Hart et al. _____ 15—250.02

CHARLES A. WILLMUTH, *Primary Examiner.*